United States Patent [19]

Lorec

[11] Patent Number: 4,737,899

[45] Date of Patent: Apr. 12, 1988

[54] ELECTRIC POWER SUPPLY DEVICE FOR RADAR

[75] Inventor: Gérard Lorec, Chatenay-Malabry, France

[73] Assignee: Electronique Serge Dassault, France

[21] Appl. No.: 946,801

[22] Filed: Dec. 29, 1986

[30] Foreign Application Priority Data

May 14, 1982 [FR] France .................. 82 08516

[51] Int. Cl.[4] .................................. H02M 3/315
[52] U.S. Cl. ...................... 363/24; 363/40; 342/203
[58] Field of Search .............. 363/20, 22, 24, 25, 363/26, 39, 40, 45, 65, 69, 70, 71, 97, 124; 328/265; 342/175, 200, 201, 202, 203

[56] References Cited

U.S. PATENT DOCUMENTS

| 3,641,419 | 2/1972 | Koltuniak et al. | 363/70 |
| 3,967,181 | 6/1976 | Chambers et al. | 363/23 |
| 4,253,137 | 2/1981 | Rao | 363/21 |

FOREIGN PATENT DOCUMENTS 0068884  5/1980  Japan .................. 363/40

OTHER PUBLICATIONS

Malvino, Transistor Circuit Approximations, 1980, pp. 276 and 277.

Primary Examiner—Patrick R. Salce
Assistant Examiner—Judson H. Jones
Attorney, Agent, or Firm—Handal & Morofsky

[57] ABSTRACT

A very high voltage stabilized power supply device for a pulse radar system, in particular an airborn radar, which comprises a primary winding connected in a series with an electronic power commutation switch actuated at the recurrence frequency of the pulses produced by the radar, or at a multiple frequency of the recurrence frequency, to the terminals of a rectified and filtered voltage supply source. The primary is wound around an inductive element on which are wound a plurality of secondary windings with a primary-secondary winding transformation ratio equal to unity. Each secondary winding is connected in series to a diode with a filter capacitor in parallel. The outputs of the secondary circuits are connected in series so that their voltages accumulate at the output of the power supply unit. Several modules of this type may be used, with their commutating elements actuated on a staggered basis.

14 Claims, 3 Drawing Sheets

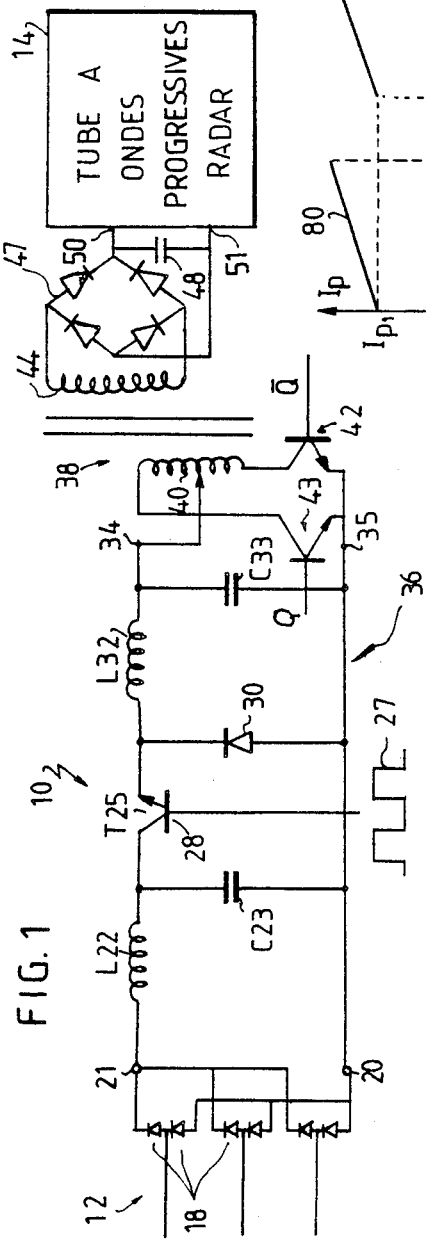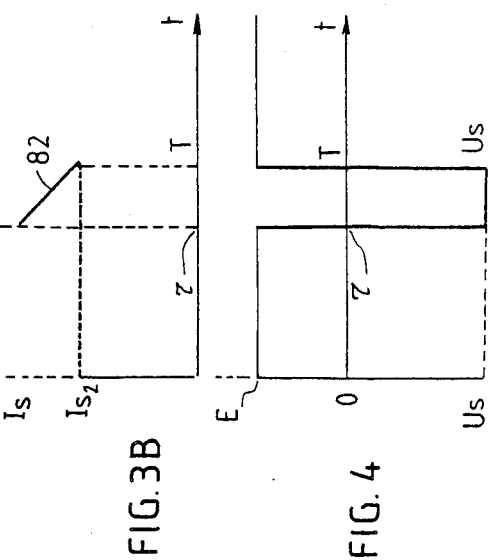

ELECTRIC POWER SUPPLY DEVICE FOR RADAR

FIELD OF THE INVENTION

The invention relates to a stabilised power supply for radar systems and in particular, hyperfrequency generators for travelling wave tubes in pulse radar systems. It relates in particular to radar systems installed on board vehicles such as aircraft or spacecraft wherein considerations of space and weight are essential and which are intended to operate in difficult environmental conditions.

PRIOR ART

The travelling wave tubes used as wave generators in radar systems operate at very high voltages of some thousands, and even several tens of thousands of volts. The operation of a power supply intended to provide such a direct voltage is generally based on a three phase AC supply system of several hundreds of volts which can be subject to considerable amplitude fluctuations especially in on board installations. It is usual for the specifications for installations installed on board vehicles to make provision for a dynamic ratio of 1 to 3 for the voltage from which the stabilised voltage for the power supply of these installations has to be produced.

Hitherto, the stabilised power supplies used for travelling wave tubes of radar systems generally comprised two sub-assemblies, a low voltage regulator followed by a transformer-converter intended to bring the low voltage directly or in stages to the desired output voltage level.

Each one of these two sub-assemblies operates by chopping a direct voltage by means of an electronic commutating circuit whose frequency is relatively high, to allow the transformer used to operate under favourable conditions.

This operating principle entails the creation of much interference at the chopping frequency and at the higher harmonic frequencies of the latter. These interferences are propagated over the supply lines as far as the radar proper.

It is known that because of the low power level of the signals received by a radar system in particular, it is essential to reduce the signal noise level both at reception and at transmission. In particular, it is most important to transmit signals of great spectral purity.

OBJECTS OF THE INVENTION

In modern radar systems, it is increasingly difficult to obtain this spectral purity, in particular in pulse radar systems, particularly because of the intermittent commultation of their pulse repetition frequency, called the recurrence frequency, between discrete values and because of the need to cause the form factor of the emitted waves to vary.

It is therefore important to prevent the spectral purity of the radar from being additionally affected by interference coming from the stabilised power supply system for its generator tube. For this purpose, filters are used in the conventional systems intended to eliminate the commutating interference inherent in the power supply. These filters must be very efficient, because of the low ripple level needed at the output of the VHV [very high voltage] supply unit. As a result, they tend to accumulate a relatively high energy level. This leads to difficulties in protecting the tube in the event of short circuits, even of very short duration, within the tube. Moreover, it is not possible to eliminate entirely the unwanted streaks generated in the supply unit itself at frequency levels which are much lower than the recurrence frequency of the radar, and their propagation towards the various subassemblies of the radar and in particular, towards the receiver. It is therefore necessary to take exceptional precautions at the level of these sub-assemblies to filter out these streaks.

These factors combine to make the present power supply units of the sets heavy, bulky and having, in spite of everything, unwanted streak levels which are prejudicial to the proper operation of the radar systems presently envisaged.

The invention aims at reducing these drawbacks by providing a new stabilised power supply structure for a hyperfrequency generator of a pulse radar system, in particular, in an onboard radar system.

SUMMARY OF THE INVENTION

In accordance with the invention, such a stabilised power supply unit comprises a buck boost converter module which contains a primary winding on an inductive element connected to the primary voltage source by an electronic power commutation switch controlled by a voltage regulation signal at the repetition frequency of the radar pulses or at a multiple of the latter, so that during each period, the conduction time of the switch should exceed the blocking time; and at least one secondary circuit whose output is connected between the very high voltage output terminals of the device and which comprises a secondary winding on this inductive element with a winding transformation ratio in relation the primary approximating unity, mounted in series with (a) a rectifier with a short recovery time, the rectifier being connected so that it is not conductive when the power commutation switch is conductive, and (b) a filter capacitor in parallel with the circuit in series formed by the secondary winding and the rectifier.

In accordance with a preferred embodiment of the invention, the buck-boost converter module comprises a plurality of such secondary circuits connected in series in order to contribute to the very high output voltage and whose windings are wound on the same inductive element, the individual transformation ratio between these secondary windings and the primary winding approximating 1.

In a pulse radar system, the commutation of many circuits at the repetition frequency of the pulses generates interference at this frequency and at the harmonic frequencies. An attempt is therefore made in these radar systems to gather and to process the effective signals outside the spectral frequency zones of this interference and these zones are eliminated by filtering.

It is therefore advantageous to be able, by virtue of the invention, to control the switching frequency for the chopping of the signals necessary for the low voltage-high voltage transformation in accordance with the recurrence frequency of the radar system. In fact, in these conditions, all the interference signals produced at this recurrence frequency or at multiples of it, and which, having passed the filter are propagated towards the operational circuits of the radar, are eliminated at the same time as the interference signals generated by the radar itself.

In this respect, the invention is based on the fact that it is possible to obtain such a power supply under favourable conditions with electronic components operating at frequencies of the same order as the recurrence frequency of a radar system or of its multiples, by using a converter circuit of the buck-boost type, whose transformation ratio approximates to one and is preferably equal to unity.

In particular, it has been observed that it is possible to minimise the winding interference signals of a transformer when the transformation ratio of the latter is equal to 1. As soon as the transformation ratio moves away from this value, there is a rapid increase in the interference factors such as stray capacitances and leakage inductances. A buck-boost converter provides a suitable and straightforward means for obtaining a voltage amplification whilst maintaining the transformation ratio of the windings at its optimum value. The preferred embodiment of the invention, moreover is, based on the fact that it is possible to produce a high secondary voltage from one and the same primary winding by means of a series connection of secondary circuits such as defined above. This structure has the advantage that each rectifier is individually subjected to a relatively low inverse voltage. At the same time, the division of the secondary circuit into a multiplicity of element ary circuits whose direct voltages are added at the output, makes it possible for an individual transformation ratio approximating to, or equal to, 1 to maintain the voltage at the terminals of an electronic commutation switch with high chopping frequencies in the primary circuit, at very reasonable values.

Thus it is possible to obtain in one signal commutation stage, a transformation at one and the same time into a very high voltage and a regulation by means of a low voltage whose dynamic fluctuation ratio can be relatively large.

The circuit arrangement obtained is straight-forward. It makes it possible to obtain a maximum limitation of the sources of the commutation signals, while working at a favourable frequency from the point of view of eliminating unwanted signals which are inevitably propagated as far as the radar circuits proper.

The design adopted is favorable from the point of view of weight and bulk. Moreover, it makes it possible to use VMOS field effect transistors as the electronic power commutation switches capable of operating at frequencies which can amount to several hundreds of kilohertz while respecting the constraints imposed by the present state of the art on such components.

In a significant embodiment of the invention a stabilised power supply is obtained by placing transformer modules of the type defined above side by side and connecting them to the terminals of a divider bridge for the source voltage. The primary windings of each module are commutated by a respective electronic commutation switch, these switches being preferably actuated with a phase shift in relation to each other to minimize the ripples of the very high output voltage obtained, by a superposition of the individual output voltages of these modules. One may then designate the set of such modules as lines and, according to the voltage levels required at the output, combine several lines made up in this way.

BRIEF DESCRIPTION OF THE DRAWINGS

Additional explanations are given together with the following description of some modes of embodiment with reference to the attached drawings wherein:

FIG. 1 schematically illustrates an example of an embodiment of a stabilised power supply for a radar system in the prior art;

FIG. 2 schematically illustrates the embodiment of a converter module in accordance with the invention;

FIG. 3a and 3b are diagrams of the primary and secondary current signals respectively;

FIG. 4 is a diagram illustrating the primary and secondary voltages of the device of FIG. 2;

DESCRIPTION OF THE PREFFERRED EMBODIMENTS

Figure 5:
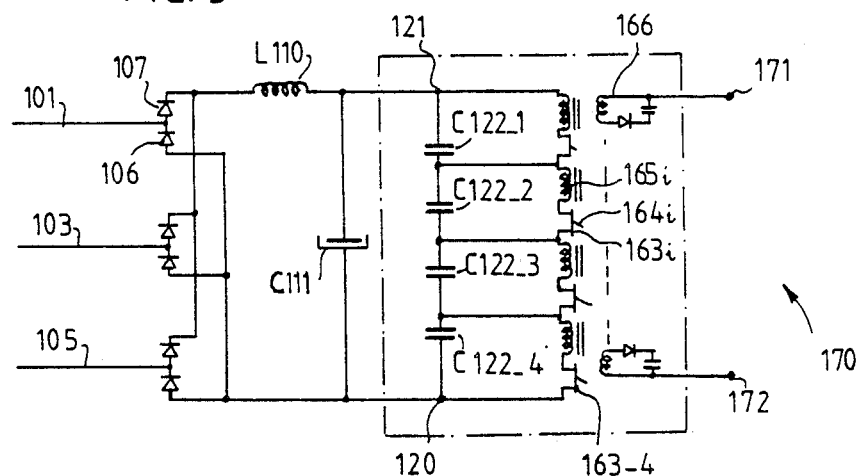
FIG. 5 is a circuit diagram of a four module converter line in accordance with the invention.

In FIG. 1, there has been represented very schematically a conventional stabilised power supply 10 connected to a voltage source 12 for supplying a travelling wave tube 14 for a radar system. The signals from source 12 are derived from the three phase mains on board an aircraft suitably rectified by a set of diodes such as 18 so as to supply a rectified voltage at the two input terminals 20 and 21 of the power supply unit 10. The latter is, first of all, filtered by an LC circuit comprising a choke $L_{22}$ and a capacitor $C_{23}$, then chopped in a regulator 36 by a commutation element $T_{25}$ whose base 28 is actuated by a constant frequency signal, for instance 10 kilohertz (schematically outlined by the wave shape 27) and whose cyclic ratio can be modulated to obtain the stable voltage level desired at the output. The voltage chopped at the output of the commutation switch $T_{25}$ is filtered by an LC circuit comprising a choke $L_{32}$, -capacitor $C_{33}$ in order to produce at the output terminals 34 and 35 of the regulator 36, a regulated and filtered direct voltage signal. A booster diode 30 is connected in parallel to circuit $L_{32}$-$C_{33}$. To the terminals 34 and 35, there is connected a converter 38 comprising a primary transformer winding with a central tapping 40 connected in series with two electronic commutation switches 42 and 43 operated on a push-pull basis at a frequency of, for example, 10 kHz to chop the voltage in the winding 40. The latter forms part of a transformer with a high transformation ratio so as to induce in one or several secondary windings 44, a very high voltage rectified and filtered by the bridges of diodes 47 and capacitors 48, which is applied to the inputs 50 and 51 of the travelling wave tube 14.

In an outfit on board, the frequency of the source 12 can, for instance, be 400 Hz and the rectified voltage between terminals 20 and 21 can have a nominal value of approximately 200 volts but be subject to fluctuations between, on average, 100 and 400 volts. The circuit controlling the chopper $T_{25}$ must therefore have a corresponding dynamic ratio for the variation of its cyclic ratio. It is desirable in this system that the low voltage regulation can be effected in conditions where the insulation wear resistance of the circuits used can be easily mastered. The regulated voltage obtained can then be amplified by the converter 38 so as to attain the very high levels required for the power supply of the radar generator tube. It is preferable in this respect to limit the commutation frequency of the switch 42, since the extent of the interference signals transmitted by the transformer and related to the commutation increases with the commutation frequency. In spite of these precautions, considerable overshoots are present in the secondary circuits 44 and 45 which necessitate extremely energetic filtering. These interference signals whose frequencies are considerably lower than the recurrence frequency of the radar pulses are transmitted to the constituent units of the latter either directly on the power supply lines or by radiation.

A converter module 62 in accordance with the invention is represented in FIG. 2. To terminals 60 and 61 between which the rectified source voltage E is available, there is connected a primary winding 65 of a transformer wound on an inductive element 66 and mounted in series with a commutation switch 63 constituted by a VMOS type field effect power transistor. For this purpose, a transistor of category IRF450 may be used which is made by the INTERNATIONAL RECTIFIER Company of the United States of America. Such a component is capable of commutating currents which can attain 10 amps at frequencies which may reach 200 to 300 kHz under the control of its grid voltage 64. Its blocking voltage can attain 500 volts. It thus makes it possible to chop outputs of the order of 125 watts in radar environments.

On the magnetic core 66 there are wound a series of secondary windings, six in number in this example, numbered from 68-1 to 68-10. Each secondary winding such as 68-1 is connected to a rectifier diode 69-1 in such a way that when the switch 63 is in the conducting mode, the voltage induced in the winding 68-1 takes the diode 69-1 in the reverse direction. A capacitor 70-1 is connected in parallel to the circuit formed by the winding 68-1 and the diode 69-1 between the two terminals 71-1 and 72-1 which constitute the output terminals of the secondary circuit thus formed. The secondary circuits 1 to n are connected in series in such a way that a resultant voltage is produced between the terminals 71-1 and 72-10 which is the sum of the individual direct current voltages at the outputs of each of these secondary circuits.

The diodes 69-1, 69-10 are elements with very short recovery times allowing operation at the same frequency as the VMOS switch 63, these diodes being capable of blocking reverse voltages of the order of 300 to 600 volts.

The number of turns of each winding 68-1 to 68-10 is equal to the number of turns of the primary winding 65 so as to obtain a transformation ratio of 1.

The module 62 made in this way is a buck boost module which can operate on a discontinuous or continous basis, depending on the respective values of the inductance L of the primary 65, the commutation time T of the control grid 64, and the output power. In the embodiment herein described, operation is preferred in the mode term continuous, that is to say when the current within each operating stage of the primary and secondary circuits is not broken.

In operation, when the switch 63 is in the conducting mode during a time $\tau$ which is shorter than the commutation time T and regulated according to the output voltage to be obtained, an increasing current $I_p$ circulates in the winding 65 of the inductance coil L. It charges the primary inductance (see line 80 in FIG. 3a). During this time, no current circulates in any of the secondary windings 68-1 to 68-10 because of the polarity chosen for the diodes 69-1 to 69-10, as shown in the diagram of FIG. 3b. When the control signal applied to the grid 64 switches off the switch 63, the current $I_p$ ceases. From instant $\tau$ of this commutation a decreasing current $I_s$ (line 82) circulates in each one of the secondary windings 68 in the forward or conducting direction of the respective diodes 69. This current, which corresponds to the discharge of the inductance coil 65, 66, is interrupted at instant T when the switch 63 is again rendered conductive (the end of the actuating period of the chopper). The level of the current $I_{s2}$ at this moment is equal to the level of the current $I_{p1}$ which then reappears in the primary circuit.

If one considers the voltage at the terminals of the primary winding 65 and secondary windings 68-1 to 68-10 (FIG. 4), it will be observed that, as regards the winding 65, this voltage remains constant and equal to E during the time $\tau$ and is then reversed when the switch 63 is switched off. A voltage $U_s$ then appears between the terminals 71-1 and 72-1 of each output circuit i. This voltage signal continues during the whole time interval from instant $\tau$ to instant T. If care is taken to ensure that the time $\tau$ is longer than T-$\tau$, the voltage $U_s$ exceeds the voltage E. The voltage appearing between the output terminals 71-1 and 72-10 of the output of the converter module is equal to 10 $U_s$.

The output voltage $U_s$ has a value of $$U_s = E\tau$$

If it is assumed that the secondary circuits have been rated to produce a voltage of 150 volts at their output when the respective diode 69 is in a conducting mode during its non-conductive phase comprised between O and , this diode is subjected to a reverse voltage of E+150 volts. With E=67 volts, this voltage amounts to 217 volts, which value can be easily held at present with components having a short recovery time, for operation at very high frequencies. The output voltage of the module 62 amounts to 1,500 volts in these conditions.

A stabilised power supply unit constituted by four modules similar to the module 62 of FIG. 2 will now be considered (FIG. 5). The voltage between phases 101, 103 and 105 of the three phase power supply is rectified by diode pairs such as 106 and 107 and then filtered by an LC circuit comprising inductance coil L-100 and capacitor C-111 to produce a direct voltage between the terminals 120 and 121 of a capacitive divider comprising four capacitors $C_{122-1}$ to $C_{122-4}$. To the terminals of each one of these capacitors $C_{122-1}$, there is connected a primary transformer winding $165_i$ in series with a VMOS switch $163_i$ with a control grid $164_i$. To each one of them, there corresponds a battery of six secondary windings 166, each comprising one winding, one diode, and one capacitor connected in the way set out above with reference to the secondary circuits of FIG. 2.

The stabilised power supply unit formed by the four modules of FIG. 5 constitutes one power supply line 170. The secondary circuits 166 are connected in series between the very high voltage output terminals 171 and 172 of the line 170, the voltage between these two terminals being the sum of the output voltages of these secondary windings, that is to say, in this example 150×10×4=6000 volts. Since each module transmits 125 watts, it is thus possible to obtain an output of 500 watts at the output of the line 170.

Three cases will now be considered with the rectified voltage at the input terminals 120, 121 of this supply line 170 amounting respectively to its nominal value of 268 volts, to a minimum value of 135 volts or to a maximum value of 420 volts.

During operation at the nominal voltage each winding $165_i$ is then energised at a voltage of $268 \div 4 = 67$ volts. On the assumption of operation at 250 kHz, an 85% efficiency and of a secondary voltage of 250 volts per winding, the commutated amperage is 3.25 amps. The drain source voltage of each commutation switch $163_i$ during the blocking is formed by the superposition of the supply voltage, that is to say 67 volts, and of the voltage induced by the said secondary windings 166 (during the respective operating stage $T - \tau$). The number of turns of each secondary winding circuit 166 is equal to the number of the turns of the primary winding $165_i$. The corresponding induced voltage is therefore 150 volts. As a result, the maximum drain-source voltage at the terminals of the VMOS switch $163_i$ is 217 volts. It will be observed that the values of the current and of the operating voltge of the VMOS switch $163_i$ are amply within the limitations of use mentioned above for the IRF450 component.

In the case of operating the maximum voltage of 420 volts, these values are respectively $I = 2.4$ amps and $V = 255$ volts; in the case of operating at the minimum voltage of 136 volts, the values become $I = 5.41$ amps and $V = 184$ volts. Thus the VMOS component $163_i$ remains in an operating range which allows it to absorb voltage transients without sustaining any damage and to have a power reserve allowing other types of circuit to be envisaged, the operations always being effected at frequencies corresponding to the recurrence frequency of the radar system supplied by this power supply or at a multiple thereof.

It has been observed that for a transformation ratio of one (the ratio of the number of primary turns in relation to the number of turns of each secondary circuit), it was possible to minimise the interference from the winding (stray capacitances and leakage inductances), the extent of these unwanted signals rising very rapidly as soon as one leaves this value of the transformation ratio. The lay-out set out above is therefore favourable to obtaining a stabilised power supply producing a minimum of interference for supplying a radar system.

It will, moreover, be observed that on the basis of the values indicated in this example, the amplification ratio of the voltages between each elementary secondary circuit and the corresponding primary circuit of the module is relatively low. The corresponding electric fields are weak. This factor contributes towards limiting the propagation of leakage energies by way of radiation.

Figure 6:
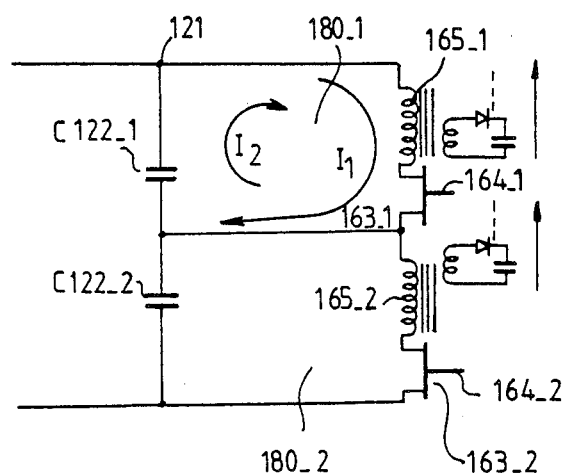
FIG. 6 illustrates the working of a two module converter line.

To illustrate the operation of a supply line such as represented in FIG. 5 formed by the stacking of several modules, reference is made to FIG. 6 wherein there have been represented the two modules 180-1 and 180-2 respectively, connected to the terminals of the capacitors $C_{122-1}$ and $C_{122-2}$ of the capacitive divider referred to above. When the VMOS switch $163_{-2}$ is switched off, (signal $\overline{Q}$ on the control grid 164-2) no current is circulating in the primary winding 165-2. If, at that moment, it is assumed that the control grid 164-1 of the commutation switch 163-1 is supplied with a signal Q rendering it conductive, a current passes through the primary winding 165-1 being the superposition of two currents: a current I1 coming from the primary source which charges the capacitors $C_{122-2}$ and a discharge current I2 from capacitors $C_{122-1}$, the reverse phenomenon takes place when the signals Q and $\overline{Q}$ are interchanged.

It is preferable to actuate the grids 164-1 and 164-2 with a time lag of T/2, T being the period of the signal actuating the chopping. This arrangement makes it, in point of fact, possible to limit the ripples of the voltage resulting from the superposition of the output voltages of the converter modules 180-1 and 180-2, the crest of the ripples of the resultant voltage in each module being staggered in relation to each other. When the two commutation switches 163-1 and 163-2 are both in the conducting mode. The voltages remain balanced at the terminals of windings 165-1 and 165-2 because of the identical inductance values of these windings.

Referring again to FIG. 5, it will be seen that one can also advantageously stagger the cycles actuating the commutation switches 163-1 to 163-4 by T/4 to minimise the overall ripple of the output voltage at the terminals 171 and 172 of the module still further.

Figure 7:
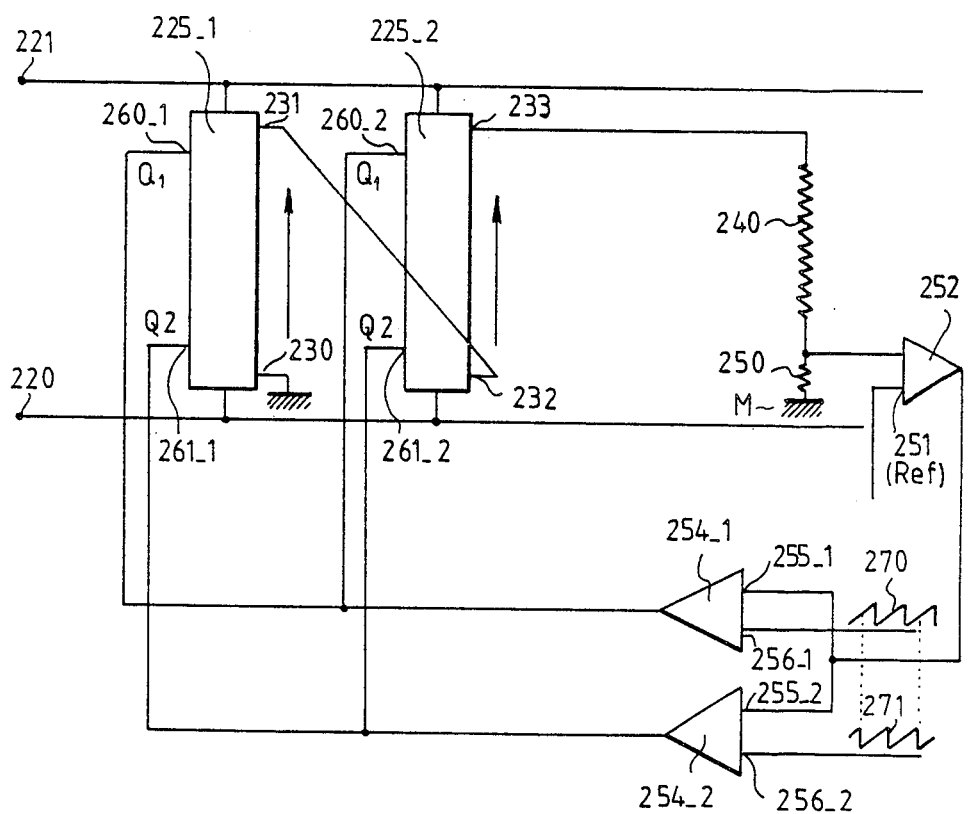
FIG. 7 is a circuit diagram of a two line converter in accordance with the invention.

FIG. 7 schematically shows how a two line very high voltage supply is obtained providing 12-k-volts at the output with a power of one kilowatt whose input terminals 220 and 221 can be supplied by a rectified and filtered voltage from the mains. Between these terminals, there are mounted two lines respectively 225-1 and 225-2 obtained in an identical manner as in the representation of FIG. 5. The output terminal 232 of the line 225-1 is connected to earth M and its output terminal 231 is connected to one output terminal 232 of the line 225-2. On the other output terminal 233 of this latter line, the voltage of 12 volts is generated in relation to earth, which is applied to the terminals of a VHV measuring bridge 210. A voltage signal is taken at the terminals of a resistor 250 in series with the measuring bridge whose value is compared, with a given reference voltage, for instance of 6 volts, applied to the input 251 of an error amplifier 252 whose output is connected to the inputs 255-1 and 255-2 of two comparators 254-1 and 254-2 which receive on their respective second input 256-1 and 256-2 a saw tooth voltage signal at a frequency of 1/T. The output of the comparator 254-1 feeds, by means of a square wave signal $Q_1$, a control input 260-1 of the line 225-1 and a control input 260-2 of the line 225-2.

The output of the comparator 254-2 feeds the respective inputs 261-1 and 261-2 of the lines 225-1 and 225-2 by means of a signal $Q_2$.

The saw tooth signals 270 and 271 of the inputs 256-1 and 256-2 are staggered by T/2 so as to obtain a staggered actuation of the choppers connected respectively to the lines 260-1, 260-2 and 261-1, 261-2. In the embodiment of FIG. 5, the control grids 164-1 and 164-3 are connected to the input 260-1, whilst the grids 164-2 and 164-4 are connected to the input 261-1. The same applies to the control grids and inputs of the same index of the line 225-2. It is, of course, possible to stagger not only the signals controlling the modules of each line, but also the lines with respect to each other so as to reduce the ripples of the output voltage still further.

One has thus obtained a very high voltage power supply whose chopping frequency can be synchronised with the recurrence frequency of the pulses of radar system to be supplied, or with a multiple frequency of the recurrence frequency. This arrangement has considerable advantages in as much the unwanted streaks generated by such a power supply do not disturb the range of the effective frequencies of the radar proper. Their level is therefore less critical and it is possible to reduce the volume of the filter of the radar assemblies without thereby impairing their performance. Moreover, thanks to obtaining the compromises set out in the above description, it is possible to obtain in a very high frequency power supply with a high chopping frequency, at one and the same, a regulation of the voltage with a high dynamic ratio, and its amplification by means of only one and the same chopper unit. This result in a simplification of the equipment, and a saving in volume and weight. To the latter, there also contributes the fact that the filter units of the VHV voltages have low ratings because of the conversion frequency used and the use of an acutation staggered over the various commutating grids as set out above.

The power supply thus obtained has an excellent resistance with regard to voltage transients such as are in particular present on the power supply systems on board an airborne craft. The efficiency is high because there is only one single stage.

The transformation ratios are, moreover, optimised from the point of view of reducing the unwanted signal elements of the winding. Finally, the low level of the voltages generated in each one of the modules participating in the preparation of the secondary voltage is accompanied by alternating electric field of low values within the insulators. In these conditions, the dielectrics operate in undemanding conditions at the high operating frequencies required by the apparatus.

We claim:

1. A pulse radar system comprising a power supply and a travelling wave tube supplied by said power supply, wherein said power supply comprises:
   first input terminals for connection to a direct current low voltage source;
   a second input for receiving a control signal having a frequency equal to or a multiple of the repetition frequency of the radar pulse;
   a transformer comprising a magnetic core having a primary winding and a plurality of secondary windings wound on said magnetic core;
   a chopper regulating device interconnected between said input terminals and said primary winding;
   said chopper regulating device comprising an electronic power high frequency commutation switch responsive to said control signal at said second input;
   said electronic power high frequency commutation switch having a conducting time exceeding its blocking time within each period;
   each secondary winding having a winding transformation ratio substantially equal to unity in relation to said primary winding;
   a rectifier arrangement in series with each secondary winding;
   each rectifier arrangement having a rectifier with a short recovery time mounted in series with said secondary winding and connected to be conductive when said electronic commutation switch is blocked;
   a filter capacitor in parallel with the series circuit formed by each secondary winding and each rectifier, and forming a multiple buck boost converter arrangement; and
   direct current high voltage power output terminals connected to the series arrangement of said filter capacitors.

2. A power supply device in accordance with claim 1, further comprising a divider of the source voltage; said multiple buck boost converter arrangement comprising at least two buck boost converter modules, a respective electronic power commutation switch being associated with each buck boost converter module, each of said buck boost converter modules having its primary windings connected by its respective electronic power commutation switch to the terminals of said divider of the source voltage, and wherein each of said converter modules has its secondary circuits connected in series between said very high voltage output terminals of the power supply unit.

3. A power supply device according to claim 2, further comprising means actuating the electronic commutation switches on a staggered basis so as to minimize the ripples of the voltage at said very high voltage output terminals of the power supply unit.

4. A power supply device according to claim 3, wherein said electronic power commutation switches are field effect transistors of the VMOS type.

5. A power supply device according to claim 2, wherein said electronic power commutation switches are field effect transistors of the VMOS type.

6. A power supply device according to claim 1, wherein said electronic power commutation switches are field effect transistors of the VMOS type.

7. A power supply device according to claim 6, wherein the winding transformation ratio of said secondary winding in relation to the primary is exactly equal to 1.

8. A power supply device according to claim 2, wherein the winding transformation ratio of said secondary winding in relation to the primary is exactly equal to 1.

9. A power supply device according to claim 3, wherein the winding transformation ratio of said secondary winding in relation to the primary is exactly equal to 1.

10. A power supply device according to claim 4, wherein the winding transformation ratio of said secondary winding in relation to the primary is exactly equal to 1.

11. A power supply device according to claim 2, comprising several lines whose outputs are connected in series, each said line comprising several of said buck boost modules.

12. A power supply device according to claim 3, comprising several lines whose outputs are connected in series, each said line comprising several of said buck boost modules.

13. A power supply device for a travelling wave tube intended to serve as a wave generator for a pulse radar system, comprising:
   first input terminals for connection to a direct current low voltage source;
   a second input for receiving a control signal having a frequency equal to or a multiple of the repetition frequency of the radar pulse;
   a transformer comprising a magnetic core having a primary winding and a plurality of secondary windings wound on said magnetic core;
   a chopper regulating device interconnected between said input terminals and said primary winding;
   said chopper regulating device comprising an electronic power high frequency commutation switch responsive to said control signal at said second input;
   said eletronic power high frequency commutation switch having a conducting time exceeding its blocking time within each period;
   each secondary winding having a winding transformation ratio substantially equal to unity in relation to said primary winding;

a rectifier arrangement in series with each secondary winding;

each rectifier arrangement having a rectifier with a short recovery time mounted in series with said secondary winding and connected to be conductive when said electronic commutation switch is blocked;

a filter capacitor in parallel with the series circuit formed by each secondary winding and each rectifier, and forming a multiple buck boost converter arrangement; and direct current high voltage power output terminals connected to the series arrangement of said filter capacitors.

14. A pulse radar system comprising a power supply device and a travelling wave tube suuplied by said power supply device, wherein said power supply comprises:

first input terminals for connection to a direct current low voltage source;

a second input for receiving a control signal having a frequency equal to or a multiple of the repetition frequency of the radar pulse;

a transformer comprising a magnetic core having a primary winding and a plurality of secondary windings wound on said magnetic core;

a chopper regulating device interconnected between said input terminals and said primary winding;

said chopper regulating device comprising an electronic power high frequency commutation switch responsive to said control signal at sasid second input;

said electronic power high frequency commutation switch having a conducting time exceeding its blocking time within each period;

each secondary winding having a winding transformation ratio substantially equal to unity in relation to said primary winding;

a rectifier arrangement in series with each secondary winding;

each rectifier arrangement having a rectifier with a short recovery time mounted in series with said secondary winding and connected to be conductive when said electronic commutation switch is blocked;

a filter capacitor in parallel with the series circuit formed by each secondary winding and each rectifier, and forming a multiple buck boost converter arrangement; and direct current high voltage power output terminals connected to the series arrangement of said filter capacitors.

several lines with outputs connected in series, each line comprising a plurality of buck boost converter arrangements.

* * * * *